United States Patent
Buchanan et al.

(10) Patent No.: US 11,601,403 B2
(45) Date of Patent: Mar. 7, 2023

(54) SYSTEM AND METHOD FOR MANAGEMENT OF CONFIDENTIAL DATA

(71) Applicant: Cyacomb Limited, Scotland (GB)

(72) Inventors: William Johnston Buchanan, Edinburgh Lothian (GB); Owen Chin Wai Lo, Edinburgh (GB); Philip Penrose, Keith Aberdeen (GB); Richard Macfarlane, Edinburgh Lothian (GB); Ian Stevenson, Edinburgh Lothian (GB); Bruce Ramsay, Edinburgh Lothian (GB)

(73) Assignee: CYACOMB LIMITED, Edinburgh (GB)

( * ) Notice: Subject to any disclaimer, the term of this patent is extended or adjusted under 35 U.S.C. 154(b) by 220 days.

(21) Appl. No.: 16/500,748

(22) PCT Filed: Mar. 12, 2018

(86) PCT No.: PCT/GB2018/050618
§ 371 (c)(1),
(2) Date: Oct. 3, 2019

(87) PCT Pub. No.: WO2018/185456
PCT Pub. Date: Oct. 11, 2018

(65) Prior Publication Data
US 2020/0092260 A1  Mar. 19, 2020

(30) Foreign Application Priority Data
Apr. 3, 2017  (GB) ..................... 1705333

(51) Int. Cl.
*H04L 9/40* (2022.01)
*G06F 16/2458* (2019.01)
*G06F 21/62* (2013.01)

(52) U.S. Cl.
CPC .......... *H04L 63/04* (2013.01); *G06F 16/2458* (2019.01); *G06F 21/6227* (2013.01); *H04L 2209/60* (2013.01)

(58) Field of Classification Search
CPC . H04L 63/04; H04L 2209/60; G06F 16/2458; G06F 16/148; G06F 21/6227; G06F 21/6245; G06F 21/60
See application file for complete search history.

(56) References Cited

U.S. PATENT DOCUMENTS 6,397,224 B1 * 5/2002 Zubeldia ............... G16H 10/60
                                                           707/999.102
7,870,614 B1 * 1/2011 Duhaime ............ G06Q 20/383
                                                                726/28

(Continued)

FOREIGN PATENT DOCUMENTS

EP    3024169 A1    5/2016

OTHER PUBLICATIONS

Fan B, Andersen DG, Kaminsky M. Cuckoo filter: Better than bloom. USENIX Programming. Aug. 2013; 38(4):36-40. (Year: 2013).*

(Continued)

*Primary Examiner* — Robert B Leung
(74) *Attorney, Agent, or Firm* — Cantor Colburn LLP

(57) ABSTRACT

A management request is received by a system for carrying out one or more data management operations (including, but not limited to, adding data, merging data or searching for data). The management request is received from a requesting entity. The system comprises a representation database, which comprises at least one secure element. The at least one secure element is a representation of at least one dataset containing confidential data elements stored in at least one database owned or operated by a third party entity. The management request is processed by performing at least one (Continued)

operation, for example by a processing component in the system, on the representation database. In a third step, a processing result is provided, which comprises any suitable information or data content. The processing result is dependent on the contents of the management request.

33 Claims, 17 Drawing Sheets

(56) References Cited

U.S. PATENT DOCUMENTS

| | | | |
|---|---|---|---|
| 7,958,102 B1 | 6/2011 | Satish | |
| 2003/0084057 A1* | 5/2003 | Balogh | G06F 16/2315 |
| 2006/0026156 A1* | 2/2006 | Zuleba | G06F 21/6227 |
| | | | 707/999.005 |
| 2010/0005073 A1 | 1/2010 | Bousquet | |
| 2013/0246334 A1 | 9/2013 | Ahuja et al. | |
| 2014/0052999 A1* | 2/2014 | Aissi | H04L 9/08 |
| | | | 713/189 |
| 2014/0281578 A1 | 9/2014 | Bennison | |
| 2015/0288665 A1 | 10/2015 | El Emam | |

OTHER PUBLICATIONS

Eppstein D. Cuckoo filter: Simplification and analysis. arXiv preprint arXiv: 1604.06067. Apr. 20, 2016. (Year: 2016).*
European Communication pursuant to Article 94(3) EPC issued in counterpart EP Application No. 18711664.5 dated Nov. 25, 2021.

* cited by examiner

SYSTEM AND METHOD FOR MANAGEMENT OF CONFIDENTIAL DATA

CROSS REFERENCE TO RELATED APPLICATION

This application is a 35 U.S.C. § 371 U.S. national phase entry of International Application PCT/GB2018/050618, having an international filing date of Mar. 12, 2018, which in turn claims priority to GB 1705333.1, filed on Apr. 3, 2017, the contents of each of which are incorporated herein by reference in their entirety for all purposes.

FIELD

The present invention relates to systems and methods for management of data, and in particular to systems and methods for management of confidential data.

BACKGROUND

Data, and the management thereof is becoming increasingly important both in the public and the private domain, due to the increase in data being created and stored by private persons and by organisations or businesses. Many businesses or organisations are reliant on data, and the sharing thereof with business partners or other entities, in order to operate successfully and/or generate revenue. As such, data exchange (such as file sharing or online cooperation) between private persons and organisations or businesses is rapidly increasing.

Data and information exchange increasingly takes place remotely, for example via networks of a wide range of types and formats. It is well known that remote sharing and transmission of information or data increases the risk of interception of such data. To combat this, data is routinely encrypted or encoded so as to prevent, or at least reduce, the risk of unauthorized parties being able to intercept and/or make effective use of any data that is intercepted.

Additionally, data that is stored on platforms that may be accessed without authorization (e.g. by way of unauthorized entry, or "hacking") is at risk of theft and/or unauthorized use. As a majority of computing platforms are, in some fashion, connected to at least one network, even locally stored data is at risk of theft or unauthorised use. Similarly to data in transfer, confidential local data is often protected by way of encryption.

However, while encryption at least addresses these problems, it is still generally possible to break encryption if enough resources are devoted to such. Furthermore, even if confidential data is encrypted, and therefore in theory is inaccessible to unauthorized parties, it may still be shared and transmitted amongst unauthorized parties. Under certain circumstances, in particular for highly confidential data, the mere spread of data may be undesirable and/or unacceptable.

Further, if it is suspected that confidential data has been spread, it may not be possible to determine the full extent of such spread unless access to relevant or suspicious platforms or systems is given. For example, even if a first entity suspects that a second entity has somehow obtained copies of confidential data, it may not be feasible or desirable to give said first entity direct access to the databases or storage mediums of the second entity (for example if the first and second entities are competing businesses that each deal with confidential data.

Yet further, even if such access is given, searching for data may take a long time, and be resource intensive, if a significant amount of data needs to be searched. As the amount of data held by organisations and businesses is currently increasing rapidly, it may not be possible to complete a search within a suitable time frame, or indeed at all.

SUMMARY

In accordance with a first aspect of the invention, there is provided a method of data management for a system for identification of digital content elements, the method comprising:
receiving at least one management request;
processing the at least one management request by performing at least one operation on a representation database, wherein the representation database comprises at least one secure element, the at least one secure element being a secure representation of at least one dataset stored in at least one database, wherein the at least one dataset contains confidential digital content; and
providing at least one processing result.

In accordance with a second aspect of the invention, there is provided a system for managing data, the system comprising:
storage means operable to store at least one representation database;
processing means operable to perform processing steps of a method as set out above; and
communication means operable to perform receiving steps and/or providing steps of a method as set out above.

In accordance with a third aspect of the invention, there is provided a computer program product containing one or more sequences of machine-readable instructions for implementing a method as set out above.

Further aspects, features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION OF EXEMPLARY EMBODIMENTS

Figure 1:
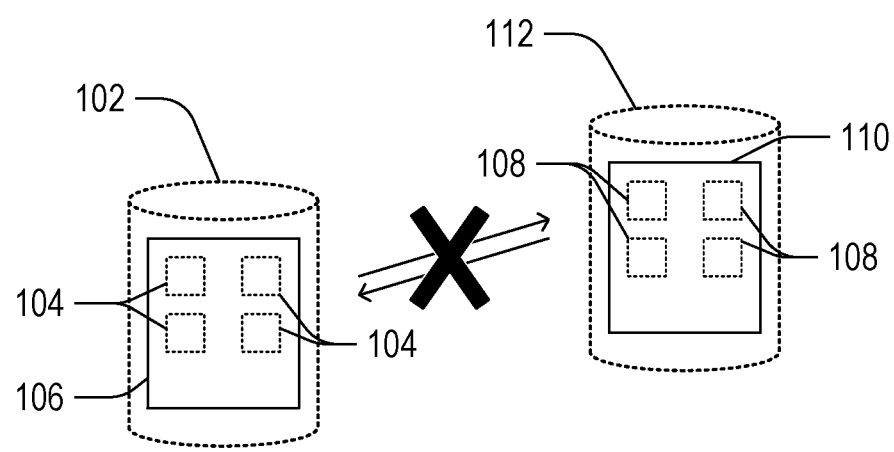
FIG. 1 illustrates data exchange between two entities.

Before discussing the exemplary methods, it may be instructive to discuss an exemplary system in which the methods may be implemented. FIG. 1 shows such an exemplary system. It will be appreciated that this system shown purely for exemplary purposes only, and that other systems in which the present methods may be implemented could easily be envisaged.

A first entity 102 is the owner of data, the data comprising a number of elements 104. The data may be stored on a suitable storage medium, such as a database 106.

Any suitable or relevant types of data or data formats, or combination thereof, could be stored by the first entity. Similarly, the first entity may be any suitable type of entity that stores data. For example, the first entity could be a business and the data could be proprietary data owned by the first entity. As another example, the data could be the property of a third party, and the first entity could be an agency controlling and monitoring distribution of the data or parts thereof. As yet another example, the first entity could be a law enforcement agency and the data could be data relevant to law enforcement (such as confiscated contraband data or otherwise illegal data).

Similarly, a second entity 112 has in its possession data 108 stored on a storage medium 110. The second entity, similarly to the first entity, may be any suitable entity that stores data.

While the first entity may typically keep its data confidential, there are certain situations in which it may be desirable or necessary to share the data with a second entity. For example, the first and second entities may be law enforcement agencies, and the data may comprise unlawful or illegal data identified as such by the first entity. In order to improve the operations of the second entity, the first entity may wish to share the identified illegal data. However, due to the sensitive nature of illegal data, it may in some instances not be desirable to share such data due to the risk of intercept. In other instances, it may not be legal for the first entity to share the data directly with the second entity.

In another exemplary situation, the first entity may be a business or other organisation and the data may comprise proprietary or otherwise important data. If the first entity suspects that the data may have been illegally obtained by a third party, it may wish to determine whether the data or at least some elements thereof are to be found, for example, within a second database operated by the second entity. However, the second database may itself comprise data proprietary to the second entity, which may accordingly be reluctant or unable to share the contents of its database with the first entity.

In another exemplary situation, the first entity may wish to share confidential data with the second entity (e.g. if there are updates to the confidential data, or if more confidential data has been obtained by the first entity). The first entity, in such an example, could be a business or law enforcement agency, and the second entity could be a data monitoring entity that is employed to monitor the presence of specific data elements at one or more third parties. In order to ensure that the second entity is able to carry out such monitoring, it is necessary for the first entity to notify the second entity of any updates to the relevant confidential data.

It will be appreciated that the situations described above are exemplary only. Other types of entities that may engage in data sharing or management along the lines described above include, but are not limited to: data storage and handling entities; copyrights or data protection enforcement entities; or other owners of proprietary data.

In the above non-limiting examples, one or both of the first entity and the second entity, it is necessary to exchange or transmit confidential data. However, as discussed above, doing so may under certain circumstances be illegal or unlawful, and under other circumstances may render the confidential data at risk of being intercepted. Additionally, once the data have been transmitted, it is possible for the second entity to potentially misuse the confidential data in a way it is not authorised to do.

It is therefore desirable to enable data to be transmitted or shared, or otherwise managed, between entities, without rendering such data vulnerable to intercept or misuse by unauthorised parties.

Figure 2:
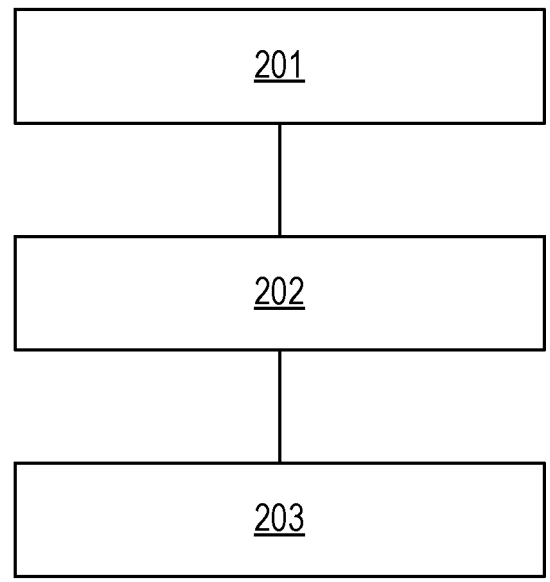
FIGS. 2 and 3 illustrate a data management method and system according to the present invention.
Figure 3:
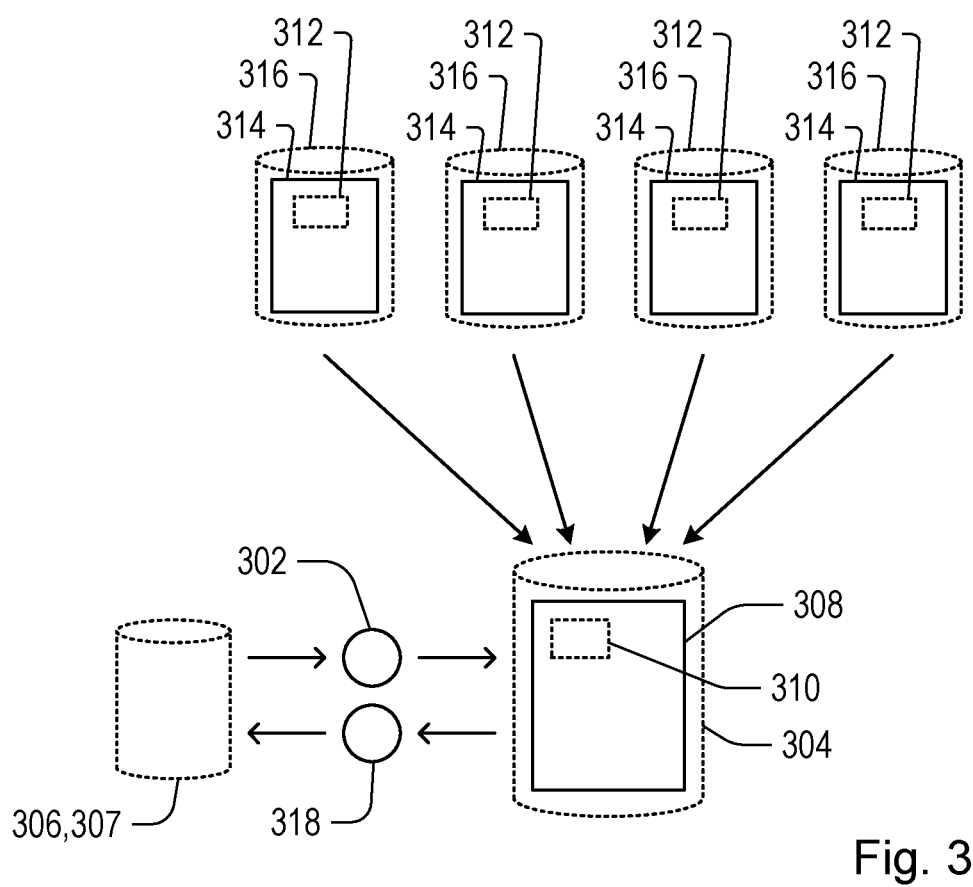

An exemplary method of data management and a system in which such a method may be implemented will now be discussed with reference to FIGS. 2 and 3.

In a first step 201, a management request 302 is received by a system 304 for carrying out one or more data management operations (such as, but not limited to, for identification of data elements). The management request may be received from any suitable source. In an example, the management request is received from a requesting entity 306. The system and the requesting entity may be connected in any suitable manner. In some examples, the system and requesting entity may be connected via a network (e.g. a wide access network, wireless network or the internet). In other examples, the system and requesting entity may be connected to a closed network (e.g. a local area network or an intranet). In yet other examples, the system and requesting entity could form part of a single computing or processing system (e.g. a mainframe computer or other centralised processing unit). In other examples, the system and requesting entity are locally connected (e.g. via a data transfer component, such as a solid state drive or connection cable).

The system may comprise any suitable elements. In an example, the system comprises a representation database 308. The representation database comprises at least one secure element 310, the secure element being a secure representation of at least one dataset 312 containing confidential digital content or data elements stored in at least one database 314 owned or operated by a third party entity 316. While only one representation database is shown in FIG. 3, it will be appreciated that a plurality of representation databases may, in principle, be used. This will be discussed in more detail in the following.

The representation database may be implemented in any suitable fashion on a suitable storage medium. In some examples, the representation database may be stored on a fixed storage medium (e.g. a disk drive). In other examples, the representation database may be stored on a non-fixed storage medium (e.g. a USB storage unit, magnetic tape or an optical disc). Specific implementations may be dependent on one or more of the system, the third parties and/or the format and encoding of the representation database or the confidential digital content.

The secure element may comprise any suitable data and may be formatted and/or encoded in any suitable fashion. In some examples, the secure element comprises one or more fragments of at least one data element. In some examples, the secure element is an encrypted copy of the digital content or data elements or fragments thereof. In other examples, the secure element is a representation of the digital content or data elements (or fragments thereof) provided by an irreversible operation. In specific examples, the secure element is a hash of a data element or a hash of a fragment of a data element. In some examples, the secure element is a hash of a plurality of data elements or fragments of data elements. In yet other examples, the secure element is a combination of whole data elements and fragments of data elements (or hashes or representations thereof). It will be realised that, although FIG. 3 shows four databases 314 operated by a corresponding third party 316, this is purely for exemplary purpose. Any suitable number of databases, operated by any number of third parties, may, in principle, be used. In some examples, each of the databases 314 is operated by a single third party entity 316. In other examples, each third party entity operates a plurality of databases (e.g. located at remote locations from each other).

It will be appreciated that any type of confidential digital content or data elements, from a plurality of different third party entities, may be stored in the representation database. Third party entities may include (without limitation): law enforcement agencies; businesses; data monitoring entities, data storage and handling entities; copyrights enforcement entities; or other owners of proprietary data. Each of these third party entities may store different types of confidential digital content or data elements. Some or all of these types of digital content or data elements may be stored in the representation database. In some examples, the system comprises a plurality of representation databases, each database storing one or several specific types of digital content or data elements. For example, the system could comprise specific representation databases for each type or classification of digital content. Examples include (without limitation): illegal data; illegally obtained data; proprietary data; data with a specific format or encryption. In other examples, the system may comprise a plurality of representation databases for each type of third part, such as (without limitation): law enforcement agencies; data protection entities; or owners of proprietary data. It will be realised that any number of specific implementations of representation databases may be envisaged within the scope of the present disclosure.

In a second step 202, the management request is processed by performing at least one operation on the representation database. Any suitable management request from the requesting entity may be processed in a suitable and relevant fashion by performing a specific operation on the representation database. In some examples, a management request comprises a plurality of specific requests, each of which result in a specific operation being performed on the representation database.

Based on one or more management requests, each of which may comprise any suitable number of specific requests, any number of suitable operations may be performed. Exemplary operations include, but are not limited to: merging one or more elements with the representation database; processing a search request; or updating the representation database. A number of exemplary operations will be discussed in more detail in the following.

The one or several operations carried out on the representation database may be performed by any suitable processing component. In an example, the system comprises a processing unit (not shown) that carries out any operations. In another example, the processing unit is located remotely from the storage medium but is connected thereto via a suitable connection.

In a third step 203, a processing result 318 is provided. The processing result may comprise any suitable information or data content, and may have any suitable form or format. It will be appreciated that the processing result, and the contents thereof, may be directly dependent on the specific contents of the management request. For example, if the management request comprises a search request, the processing result may comprise a search result.

The processing result may be provided in any suitable fashion and to any suitable receiving entity 307. In an example, the receiving entity is identical to the requesting entity 306. It will further be appreciated that, while shown as separate entities, one or both of the requesting entity 306 or receiving entity 307 may be identical to one or more of the third parties 316. In some examples, the processing result is provided to a plurality of receiving entities, one of which may in some examples be the requesting entity. In some examples, a plurality of processing results may be provided. In yet other examples, the processing result may be provided in a plurality of specific partitions, each of which may be provided in a specific fashion to one or more receiving entities. In yet other examples, the processing result may be continuously provided to a receiving entity (e.g. as a continuous stream or download of data). In other examples, the processing result may be provided internally in the system only.

In some examples, the processing result is encrypted and/or formatted prior to being provided to the relevant entity or entities. In some examples, the processing result may be used in one or more additional operations. In some examples, the processing result is transmitted to a remotely located processing device (such as a remote server) for processing prior to being provided to the relevant entity or entities.

In other examples, a third party entity is additionally notified of the processing result and/or the contents of said processing result. Such a notification may take any suitable form.

It will be appreciated, that each of the method steps discussed above may comprise a plurality of partial sub-steps, each partial sub-step being directed to a specific portion of the method step. For example, the management request may comprise a plurality of partial sub-requests, each sub-request being directed towards a specific portion of the representation database (or portion of a specific element therein).

Figure 4:
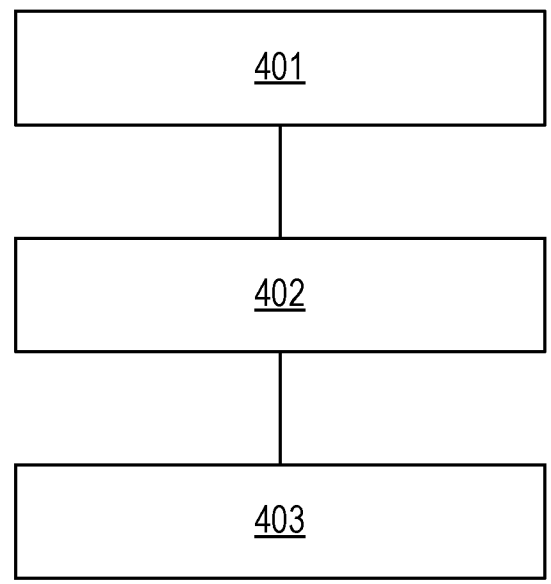
FIGS. 4 and 5 illustrate an adding method and system in which the adding method may be implemented.
Figure 5:
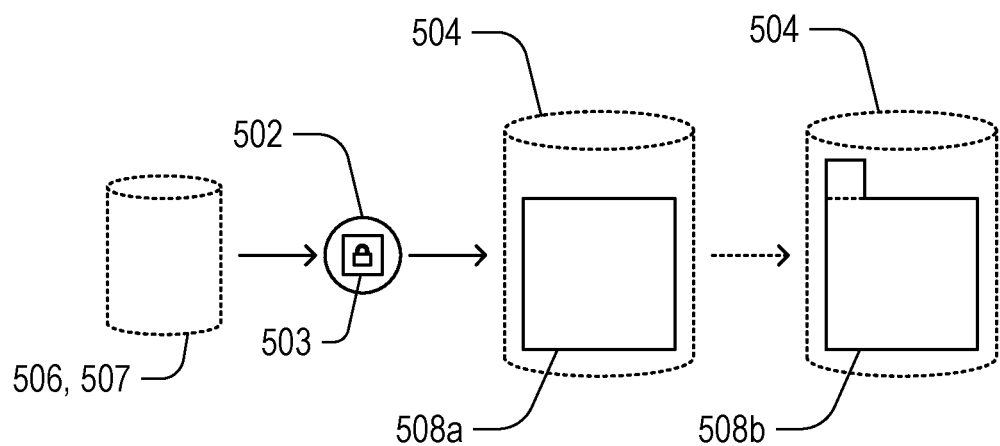

A first exemplary management request and corresponding processing step will now be discussed with reference to FIGS. 4 and 5. For ease of comparison with FIG. 3, elements of FIG. 5 similar to corresponding elements of FIG. 3 are labelled with reference signs similar to those used in FIG. 3 and examples, but with prefix "5".

In a first step 401, a management request 502 is received by a system 504, wherein the receiving step comprises receiving a first secure element 503, the first secure element being a secure representation of at least one dataset stored in a first database (not shown). Similarly to the previous example, the system comprises a representation database 508a (e.g. a representation database such as the one described with reference to FIG. 3 above).

In a second step 402, the management request is processed by adding the first secure element to the representation database, thereby to create an updated representation database 508b. The adding operation may be performed in any suitable fashion. In an example, the step of adding comprises performing a bitwise logical OR operation on the first secure element and the representation database. It will be appreciated that a number of specific implementations of the adding operation may be envisaged, depending on the characteristics of one or more of the representation database, management request or secure elements.

In a third step 403, a processing result is provided in a manner similar to that described with reference to FIG. 3 above. In some examples, the step of providing a processing result may comprise a plurality of individual operations. In an example, the step of providing a processing result comprises transmitting a notification to a third party entity. In an example, the step of providing additionally or alternatively comprises transmitting a notification to an owner of the first database.

Figure 6:
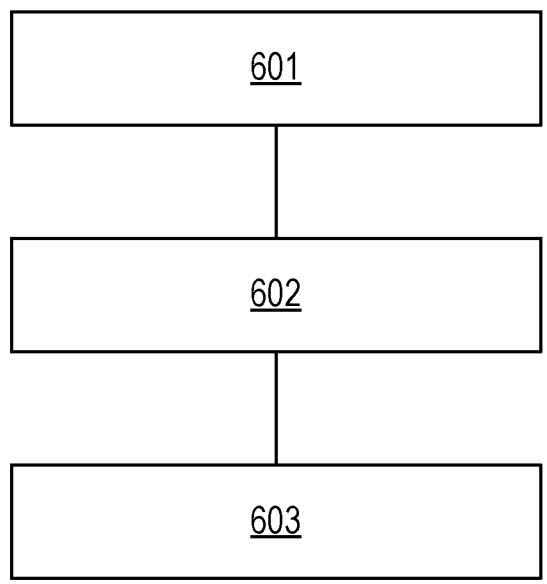
FIGS. 6 and 7 show a data request method and system in which said method may be implemented.
Figure 7:
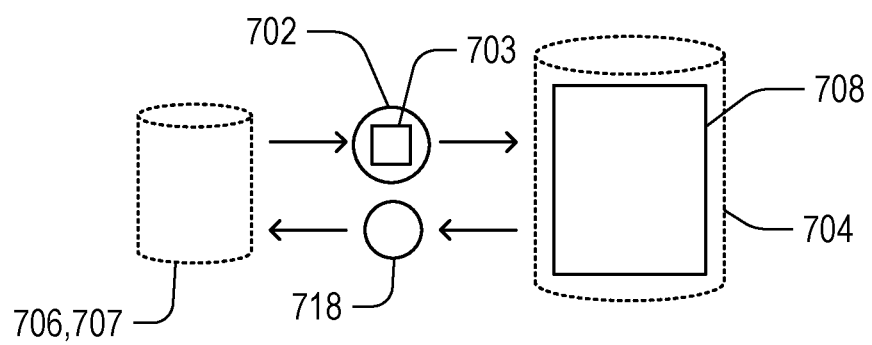

A second exemplary management request and corresponding processing step will now be discussed with reference to FIGS. 6 and 7. For ease of comparison with previous examples and Figures, elements of FIG. 7 similar to corresponding elements of the previous examples are labelled with reference signs similar to those used in previous Figures and examples, but with prefix "7".

In a first step 601, a management request 702 is received, the management request comprising a data request 703, from a requesting entity 706, wherein the data request is associated with at least one secure element (not shown). The data request may be formatted in any suitable form and may comprise any suitable number of specific data elements. In an example, the data request comprises at least one unique identifier representative of at least one secure element. It will be appreciated that a plurality of implementations of the unique identifier may be envisaged (e.g., but not limited to: incrementally increasing index values, an identifier based, e.g., on one or more characteristics of the secure element; a representation (e.g. a hash value) of the representation database; or a descriptor provided by a user).

In a second step 602, the data request is processed in a suitable fashion. It will be appreciated that the specific processing step or steps being performed is dependent on the specific implementation of the data request. For example, if the data request comprises a unique identifier, the request is in some examples processed by comparing the unique identifier in the request with the unique identifiers of secure elements stored in the database.

In a third step 603, a processing result 718 is provided, for example in a manner similar to that described with reference to FIGS. 3 and 5 above. The processing result may comprise any suitable information or data content, and may in some examples be dependent on the content of the data request.

In some examples, the implementation of the step of providing the processing result is dependent on the specific implementation of the data request. In some examples, the processing result is provided to the requesting entity. In other examples, the processing result is provided to a different entity.

A number of specific implementations of the method described with reference to FIGS. 6 and 7 will be discussed in the following for exemplary purposes only. For purposes of conciseness, only the features that differ substantially from the ones discussed above will be discussed in detail in the following.

Figure 8:
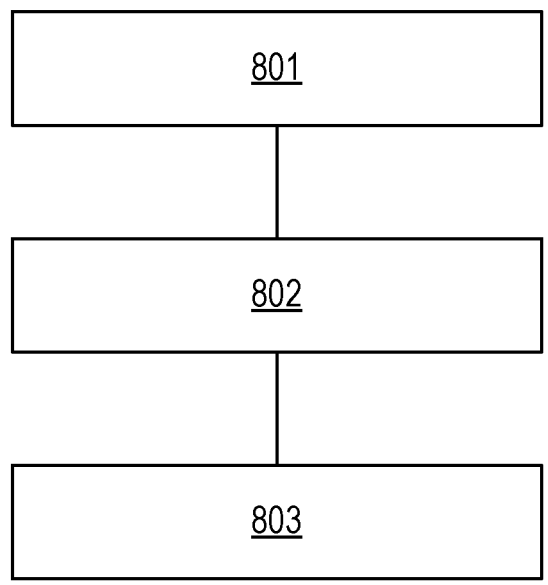
FIGS. 8 and 9 show a method for merging elements in a database and a system in which said method may be implemented.
Figure 9:
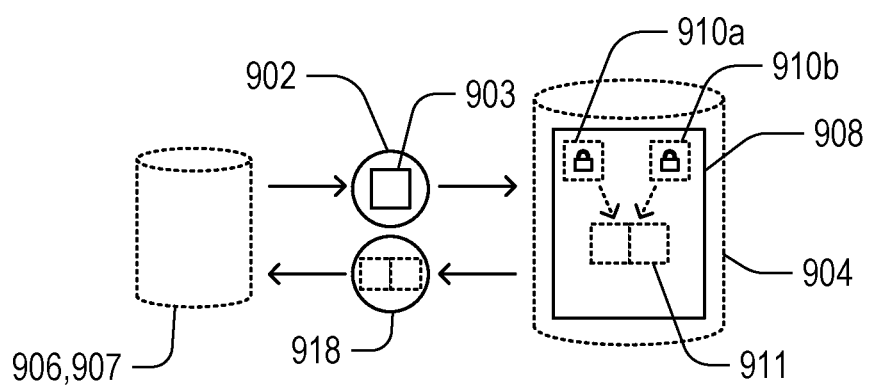

A first exemplary implementation will be discussed with reference to FIGS. 8 and 9. For ease of comparison with previous examples and Figures, elements of FIG. 9 similar to corresponding elements of the previous examples are labelled with reference signs similar to those used in previous Figures and examples, but with prefix "9".

In a first step 801, a management request 902 comprising a data request 903 is received from a requesting entity 906. In an example, the data request comprises unique identifiers of at least a first secure element and at least a second secure element.

In a second step 802, the data request is processed. The processing step comprises merging at least a part of a first secure element 910a with at least a part of a second secure element 910b. In some examples, a merged secure element 911 is created. The merged secure element may then be treated in any suitable fashion in a manner identical to any of the other secure elements in the database. For example, further operations (e.g. merging) may be carried out on it. In other examples, one of the first or second secure elements (or a part thereof) is merged into the other of the first or second secure elements without creating a separate merged secure element.

The merging step may be implemented in any suitable fashion. In one example, the step of merging comprises performing a bitwise logical OR operation on the at least first secure element and the at least second secure element. It will be realised that a plurality of specific implementations may be envisaged, and that the specific implementation may be dependent on the specific type or format of either or both of the data request or the secure elements to be merged.

In a third step 803, a processing result 918 is provided, the step of providing a processing result comprising transmitting the merged secure element 911 to the requesting entity 906. The providing step may be provided in any suitable fashion. In one example, this step is carried out by transmitting a processing result comprising the merged secure element.

By merging two or more secure elements, it becomes possible to carry out searching operations on the data content of a plurality of databases in a single operation. Furthermore, by merging two or more secure elements, the system can precisely control which entities are able to access which parts of the overall database. For example, certain requesting entities may only be granted access to part of the data content of the representation database.

Figure 10:
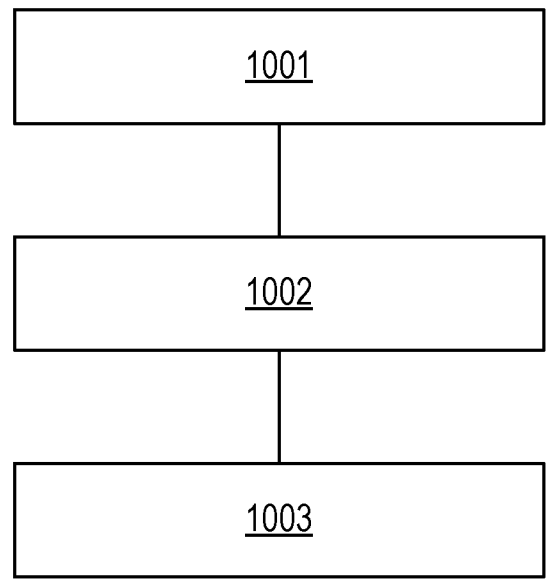
FIGS. 10 and 11 show a method for retrieving a portion of a database and a system in which said method may be implemented.
Figure 11:
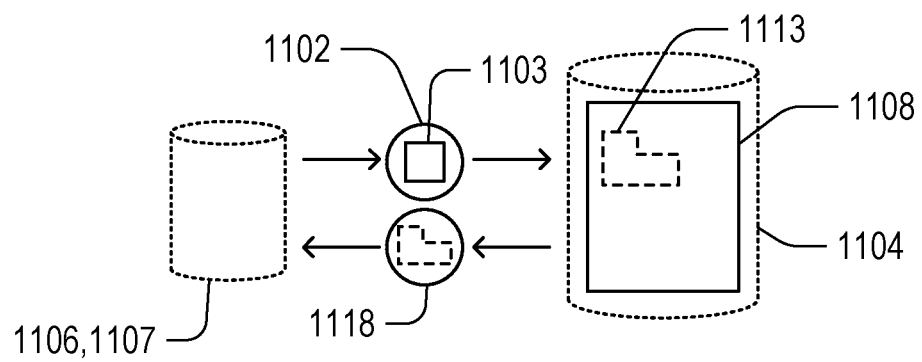

A second exemplary implementation will now be discussed with reference to FIGS. 10 and 11. For ease of comparison with previous examples and Figures, elements of FIG. 11 similar to corresponding elements of the previous examples are labelled with reference signs similar to those used in previous Figures and examples, but with prefix "11".

In a first step 1001, a management request 1102 comprising a data request 1103 is received from a requesting entity 1106. The data request may comprise any suitable information or data content. In an example, the data request comprises an identifier of at least a portion of interest of the representation database.

In a second step 1002, the data request is processed, the step of processing the data request comprising identifying at least a portion 1113 of the representation database 1108. Any relevant or suitable portion of the representation database may be identified, dependent on any suitable criteria or requirements. In one example, the identified portion comprises at least a first portion of at least a first secure element comprised in the representation database.

The identified portion of the representation database may for example comprise secure elements that may be of interest to the requesting entity (e.g. they may comprise data suspected of being illegal or obtained illegally).

In a third step 1103, a processing result is provided, the step of providing comprising transmitting the identified portion of the representation database to the requesting entity, thereby to enable processing at the requesting entity. The step of providing may be implemented in any suitable manner. In one example, this step is carried out by providing a processing result 1118 comprising the identified portion 1113 of the representation database. In some examples, the identified portion of the representation database may be subjected to further processing steps prior to transmission. In an example, the identified portion of the representation database is encrypted prior to transmission. In another example, the identified portion of the representation is encoded in a suitable fashion.

In some examples, additional information may be transmitted in addition to the identified portion of the representation database. In some examples, the additional information may be comprised in the processing result 1118. Any suitable type of additional information may be transmitted. In an example, the additional information is associated with the identified portion to the requesting entity. In some examples, the additional information comprises at least one of the following: originator information associated with the secure element; identifier information identifying an owner of the database represented by the secure element; contact information relating to an owner of the database represented by the secure element; classification information associated with either or both of the secure element or the database; a unique identifier associated with the secure element and/or the database; a unique identifier associated with the secure element and/or the database; or metadata associated with either or both of the secure element or the database.

The additional information may be transmitted in any suitable fashion as part of the method. In an example, the additional information is transmitted to the requesting entity in response to receiving a further request for additional information from the requesting entity. In another example, the further request for additional information is forwarded to an owner of a database represented by the at least first secure element, the owner being operable to transmit the additional information directly to the requesting entity in response to the forwarded further request. In yet another example, the method further comprises receiving, at an owner of a database represented by the at least first secure element, a further request for additional information, the owner being operable to transmit the additional information directly to the requesting entity in response to the forwarded further request.

The method described with reference to FIGS. 10 and 11 enables a requesting entity to perform processing on the identified portion of the representation database without necessitating the transfer of any information relating to specific secure elements or other data structures. This may, for example, be advantageous if it is necessary for the requesting entity to carry out such processing without a third party entity, or even the system itself, being aware of the specific nature thereof.

Figure 12:
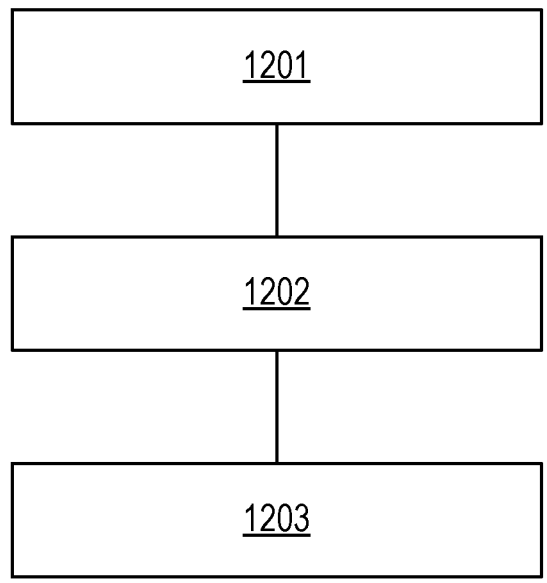
FIGS. 12 and 13 show a method for implementing a search request and a system in which said method may be implemented.
Figure 13:
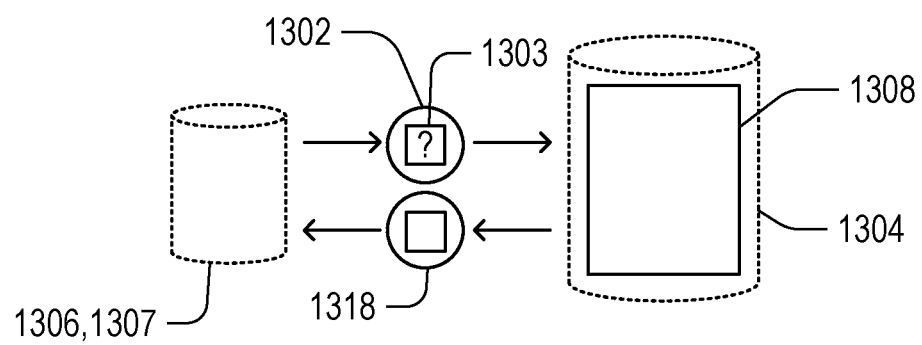

A third exemplary implementation will now be discussed with reference to FIGS. 12 and 13. For ease of comparison with previous examples and Figures, elements of FIG. 13 similar to corresponding elements of the previous examples are labelled with reference signs similar to those used in previous Figures and examples, but with prefix "13".

In a first step 1201, a management request 1302 is received, the management request comprising a search request 1303 associated with a digital content element to be searched for. For example, the requesting entity may be a law enforcement agency that is searching for one or more particular digital content elements or data elements of interest. In another example, the requesting entity could be a data protection entity that is looking to determine whether one or more protected digital content elements or data elements are to be found in a particular body of data.

The search request may be formatted in any suitable fashion, and may contain any suitable information. In some examples, the search request 1303 comprises at least a portion of a secure element to be searched for. In an example, the search request comprises a secure representation of a secure element to be searched for. In another example, the search request comprises a unique identifier of the secure element to be searched for. In an example, the search request comprises a plurality of partial search requests for a plurality of secure elements or portions thereof. In a specific example, the search request comprises a plurality of partial search requests for a plurality of portions of a secure element. This may, for example, be advantageous if certain portions of a particular secure element are of a higher priority than others or if it is necessary to search through certain portions before others. The content of the search request may in some examples be encrypted and/or formatted in a specific fashion. In an example, the encryption and/or format of the search request is dependent on one or more of: the content of the search request; at least one characteristic of the system; or at least one characteristic of the requesting entity.

In a second step 1202, the search request 1303 is processed. The search request may be processed in any suitable fashion, using any suitable processing methodology. In some examples, the processing step comprises a plurality of processing sub-steps. In other examples, wherein the method comprises a processing step having a plurality of processing sub-steps, the subsequent step of providing comprises one or more providing sub-steps that correspond to one or more of the processing sub-steps. The specific implementation of the processing step may in some examples be dependent on one or more characteristics of the search request (such as, but not limited to, formatting, encryption or content of the search request).

In a third step 1203, a processing result 1318 is provided. The processing result may be provided in any suitable fashion. In some examples, the processing result is provided substantially as described above. In some examples, providing a processing result comprises additional providing sub-steps. In an example, providing a processing result additionally comprises transmitting a notification to one or more recipients. In specific examples, the notification is transmitted to either of: an owner of at least one dataset represented by a secure element identified during processing of the search request; or an owner of at least one database being used to store at least one dataset represented by a secure element identified during processing of the search request.

An exemplary method for a search request, with an exemplary processing step and corresponding providing step, will now be discussed with reference to FIGS. 14 and 15. For ease of comparison with previous examples and Figures, elements of FIG. 15 similar to corresponding elements of the previous examples are labelled with reference signs similar to those used in previous Figures and examples, but with prefix "15".

In a first step 1401, a management request 1502 comprising a search request 1503 is received. In an example, the step of receiving is substantially as described above. The search request may be formatted and/or encoded in any suitable fashion, and may comprise any suitable content. In an example, the search request comprises at least one unique identifier of a secure element or data element to be searched for.

In a second step 1402, the search request is compared with each of the at least one secure elements 1510*a*, 1510*b*, 1510*c*, 1510*d* in the representation database 1508 of the system 1504. The step of comparing may be performed in any suitable fashion. In some examples, one or more specific algorithms may be employed. In specific examples, the one or more algorithms are used to search for one or more specific formats (e.g. bloom filters or cuckoo filters).

If the search request 1503 is determined to be associated with a secure element located within the representation database, a third step 1403 is performed. In the third step, additional information associated with the secure element is retrieved. The additional may be retrieved in any suitable fashion from a suitable location (e.g. a storage medium for additional information 1515). The storage medium for additional information 1515 may be implemented in any suitable fashion. In some examples, the storage medium forms part of the representation database. In other examples, the storage medium forms part of the storage medium on which the representation database is stored, but is organisationally separate from the representation database. In yet other examples, the storage medium for additional information is entirely separate from the storage medium on which the representation database is stored. Although it, in the present example, is shown as being performed subsequently to the second step, the third step may, in principle, be performed simultaneously with the second step.

In a fourth step 1404, subsequent to the retrieval of the additional information, a processing result 1518 is provided. In the present example, the retrieved additional information is comprised in the processing result and is transmitted to the requesting entity. The retrieved additional information may be transmitted in any suitable fashion using a suitable means. In an example, the retrieved additional information is transmitted to the requesting entity along with a retrieved secure element.

Figure 14:
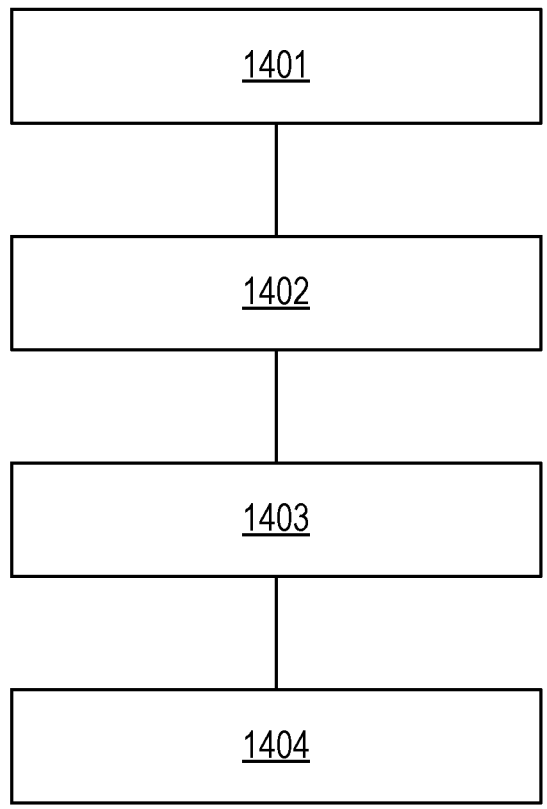
FIGS. 14 and 15 show a second example of implementing a search request and a system for same.
Figure 15:
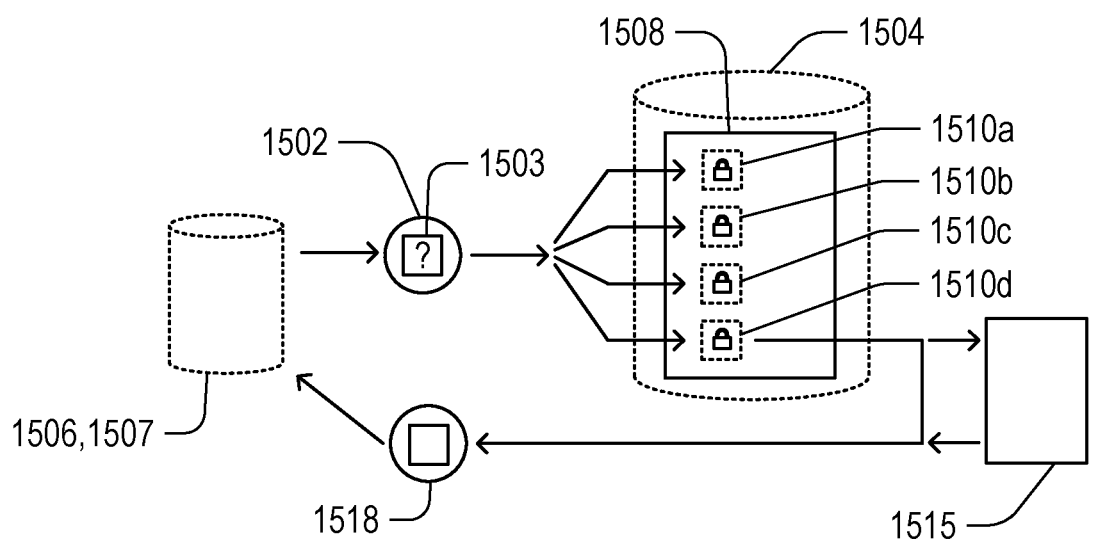

It will be appreciated that the method for providing additional information described with reference to FIGS. 14 and 15 is exemplary only, and that other implementations may be easily envisaged. In some examples, a further request for additional from the requesting entity is received. In an example, the further request for additional information is forwarded to an owner of a database represented by the secure element to be searched for, the owner being operable to transmit the additional information directly to the requesting entity in response to the forwarded further request. In another example, a further request is received, at an owner of a database represented by the secure element to be searched for, the owner being operable to transmit the additional information directly to the requesting entity in response to the forwarded further request.

The retrieved additional information may comprise any relevant or suitable specific information. In some examples, the information comprises at least one of the following: originator information associated with the secure element; identifier information identifying an owner of the database represented by the secure element; contact information relating to an owner of the database represented by the secure element; classification information associated with either or both of the secure element or the database; a unique identifier associated with the secure element and/or the database; or metadata associated with either or both of the secure element or the database.

The above-described method enables a requesting entity to obtain both the secure element as well as additional information of relevance. Furthermore, the requesting entity only gains access to the specific secure element and the corresponding additional information. The remainder of the data stored by the system 1504, in the representation database 1508 and the storage medium for additional information 1515, remains inaccessible to the requesting entity, thereby ensuring the confidentiality of said data.

It will be appreciated that the preceding examples have been implemented in a system substantially similar to that described with reference to FIG. 1. In these examples, any processing steps (such as described above) are performed at the system, which is typically a central storage system. Upon completion of the processing steps, any results (e.g. retrieved secure elements and/or additional information) are transmitted in a suitable manner to the requesting entity. The system could, for example, be operated by a data brokerage entity that transmits information to and from various other entities thereby to enable cooperation between entities without compromising the security or confidentiality of the data.

However, under certain circumstances, it may be convenient or preferable to perform at least some of the above-described method steps remotely from the system. Accordingly, in some examples, at least some of the method steps are performed locally at the requesting entity or at another location remote from the central location. This could for example be applicable if there may be security or confidentiality issues with performing any of the processing or method steps in the system itself. For example, the requesting entity may be a law enforcement agency carrying out an investigation with strict confidentiality requirements. In such a circumstance, it may not be allowable to have a search request (or, indeed, any other management request) processed by the system. In another example, the requesting entity is a financial entity carrying out an investigation regarding leaked proprietary data. In yet another example, the requesting entity may be a data protection entity investigation data that may have been illegally obtained by a third party.

Figure 16:
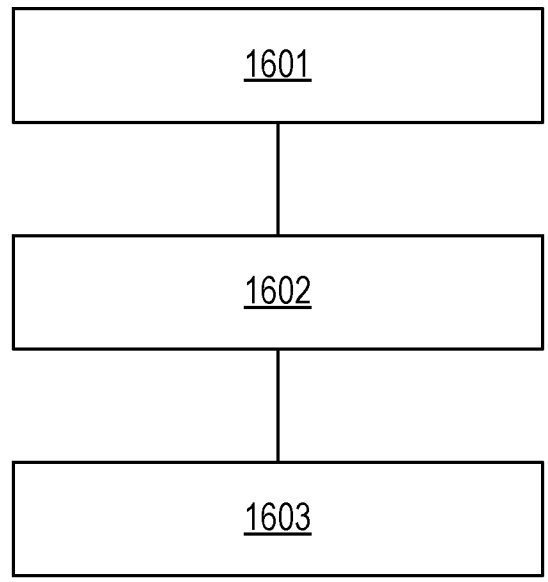
FIGS. 16 and 17 show a third example of implementing a search request and a system for same.
Figure 17:
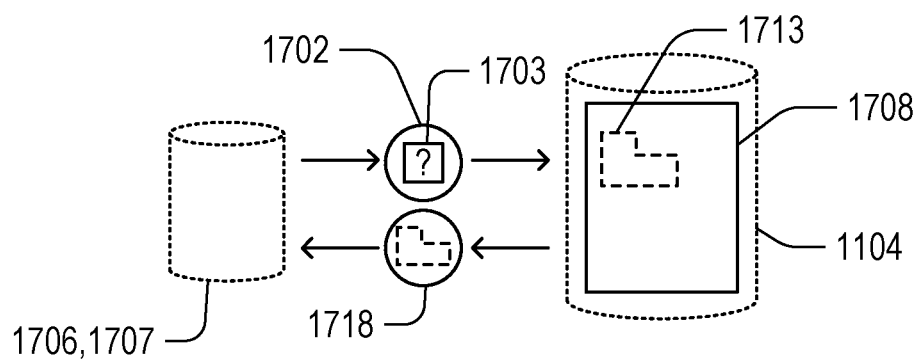

A first such exemplary method will now be described with reference to FIGS. 16 and 17. For ease of comparison with previous examples and Figures, elements of FIG. 17 similar to corresponding elements of the previous examples are labelled with reference signs similar to those used in previous Figures and examples, but with prefix "17".

In a first step 1601, a management request 1702 comprising a search request 1703 is received. In an example, the search request is substantially as described above.

In a second step 1602, the search request is processed by identifying at least a portion 1713 of the representation database 1708. The identification step may be carried out in any suitable fashion, and may identify any relevant portion of the representation database. In one example, the identified portion comprises at least a first portion of at least a first secure element comprised in the representation database. In another example, the identified portion comprises a plurality of portions of a plurality of secure elements comprised in the representation database. In other examples, the identified portion additionally or alternatively comprises at least a portion of one other element comprised in the representation database, such as one or more pieces of additional information.

In a third step 1603, a processing result is provided, the step of providing comprising transmitting the identified portion of the representation database to the requesting entity, thereby to enable further processing of the search request at the requesting entity. The identified portion may be transmitted in any suitable fashion. In one example, this providing step is carried out by transmitting a processing result 1718 comprising the identified portion 1713 of the representation database. It will be appreciated that the identified portion of the representation database may be processed in a suitable manner before transmission. The specific processing performed may be dependent on specific circumstances and may be performed to mitigate certain disadvantages. In an example, at least part of the identified portion may be encrypted in a suitable manner. In another example, at least part of the identified portion may be encoded in a suitable manner.

For example, if the identified portion has a large size, it may be unfeasible to transmit it to the requesting entity. Under such circumstances, it may be advantageous or necessary to perform data compression to minimize the amount of data that needs to be transmitted. In another example, the identified portion may be encrypted in a suitable manner in order to decrease the risk of unauthorized parties gaining access to the information. It will be appreciated that other types of processing may be envisaged and employed, either in addition to or as an alternative to the above.

In some examples, the step of providing a processing result comprises additional sub-steps. In an example, the step of providing a processing result comprises transmitting additional information associated with the identified portion to the requesting identity. In certain examples, the additional information comprises at least one of the following: originator information associated with the transmitted portion of the representation database; identifier information identifying an owner of at least one database represented by the transmitted portion of the representation database; contact information relating to an owner of at least one database represented by the transmitted portion of the representation database; classification information associated with either or both of the transmitted portion of the representation database or at least one database represented by the transmitted portion of the representation database; a unique identifier associated with either or both of the transmitted portion of the representation database or at least one database represented by the transmitted portion of the representation database; or metadata associated with either or both of the transmitted portion of the representation database or at least one database represented by the transmitted portion of the representation database.

In the exemplary method discussed above, the requesting entity receives a portion of the representation database, thereby enabling the requesting entity to perform one or more searches locally. As discussed above, this could be advantageous under circumstances wherein confidentiality is paramount. In certain situations, the requesting entity may require additional information or data (if, for example, only secure elements or portions thereof were transmitted by the system).

A second exemplary method will now be described with reference to FIGS. 18 and 19. For ease of comparison with previous examples and Figures, elements of FIG. 19 similar to corresponding elements of the previous examples are labelled with reference signs similar to those used in previous Figures and examples, but with prefix "19".

The first, second and third method steps of the second exemplary method are substantially identically to those described with reference to FIG. 16, and will therefore not be described in further detail.

In a fourth step 1804, a further request 1919 associated with a secure element to be searched for is received. The further request could, for example, be based on a determination made by the requesting entity 1906 that additional information relating to a particular secure element is required.

In a fifth step 1805, the further request is processed by comparing the further request with each of the at least one secure element in the representation database, and if the further request is determined to be associated with a secure element located within the representation database, then retrieving additional information 1920 associated with the secure element.

In a sixth step 1806, the additional information 1920 is transmitted to the requesting entity. The additional information may be transmitted in any suitable manner, for example as part of an additional processing result 1921.

Figure 18:
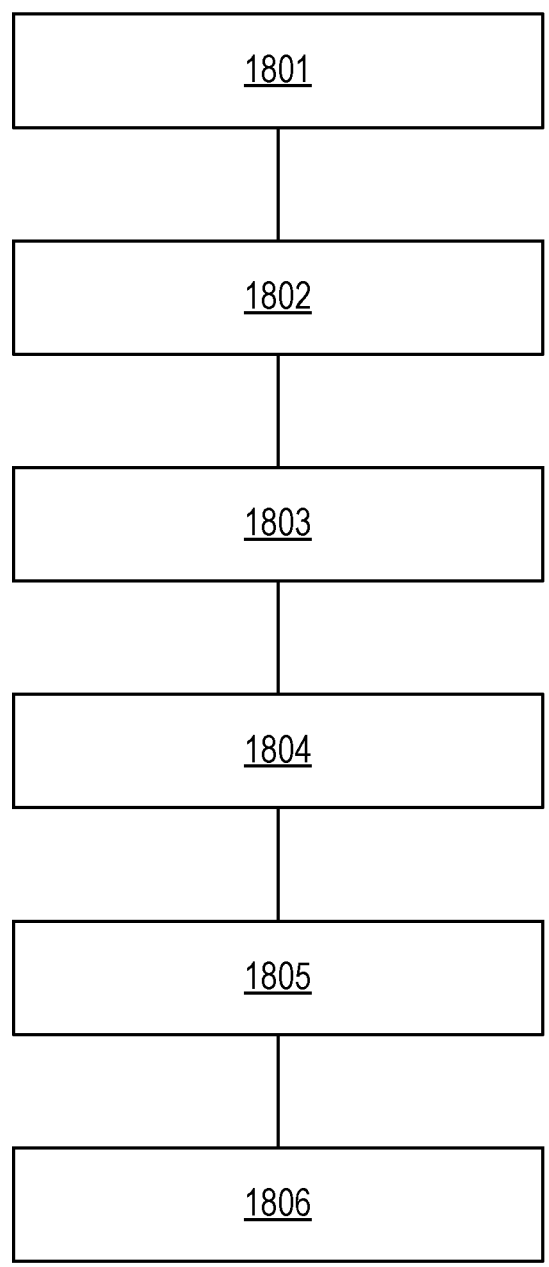
FIGS. 18 and 19 show a fourth example of implementing a search request and a system for same.
Figure 19:
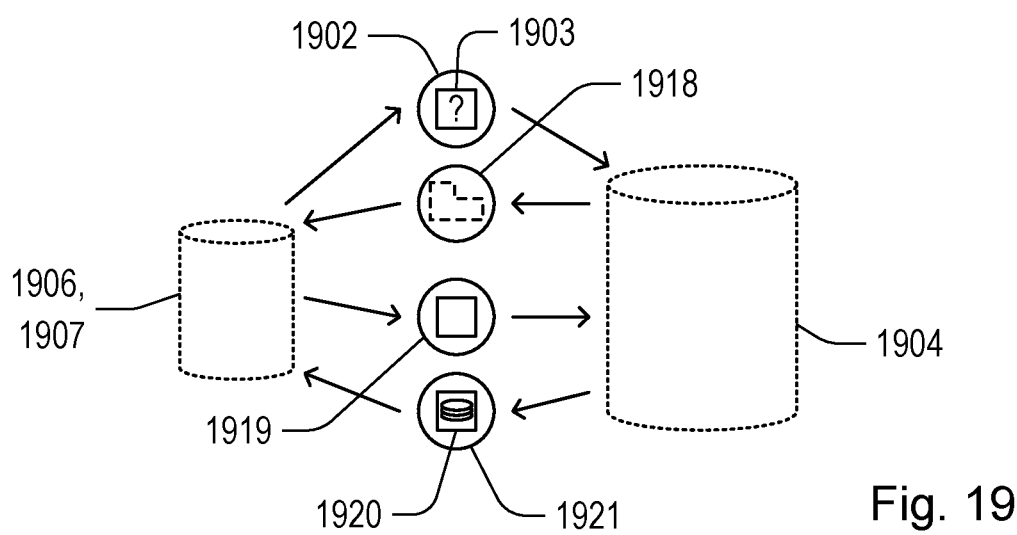

It will be appreciated that the method for providing additional information described with reference to FIGS. 18 and 19 is exemplary only, and that alternative implementations may be envisaged. In some examples, the further request for additional information is forwarded to an owner of a database represented by the secure element to be searched for, the owner being operable to transmit the additional information directly to the requesting entity in response to the forwarded further request. In other examples, a further request for additional is received, at an owner of a database represented by the secure element to be searched for, the owner being operable to transmit the additional information directly to the requesting entity in response to the forwarded further request.

Any suitable or relevant additional information may be retrieved and transmitted. In some examples, the additional information comprises at least one of the following: originator information associated with the transmitted portion of the representation database; identifier information identifying an owner of at least one database represented by the transmitted portion of the representation database; contact information relating to an owner of at least one database represented by the transmitted portion of the representation database; classification information associated with either or both of the transmitted portion of the representation database or at least one database represented by the transmitted portion of the representation database; a unique identifier associated with either or both of the transmitted portion of the representation database or at least one database represented by the transmitted portion of the representation database; or metadata associated with either or both of the transmitted portion of the representation database or at least one database represented by the transmitted portion of the representation database.

In the first and second exemplary methods discussed above, the requesting entity is in communication with the system comprising the representation database. The representation database comprises a number of secure elements (or other data elements of a relevant type and format).

In some instances, the owner of the system may also own the datasets represented by the secure elements or other data elements stored in the representation database. However, in some instances, the secure elements represent datasets owned by a third party entity that is different from the owner of the system. The secure elements stored in the representation database may be associated with data that is of high importance to the third party. In such instances may be advantageous or desirable to notify the third party when secure elements associated with its data are accessed or otherwise processed.

In some examples of the methods discussed above, the step of providing a processing result comprises transmitting a notification to either of: an owner of at least one dataset represented by a secure element identified during processing of the search request; or an owner of at least one database being used to store at least one dataset represented by a secure element identified during processing of the search request. The notification enables the owner to take any appropriate action.

It will be appreciated that the representation database, as well as any secure elements stored therein, may change over time. For example, secure elements may be added to the representation database. In other examples, new secure elements may be created, either by virtue of merging secure elements (as discussed above) or by adding to or deleting from individual secure elements.

Figure 20:
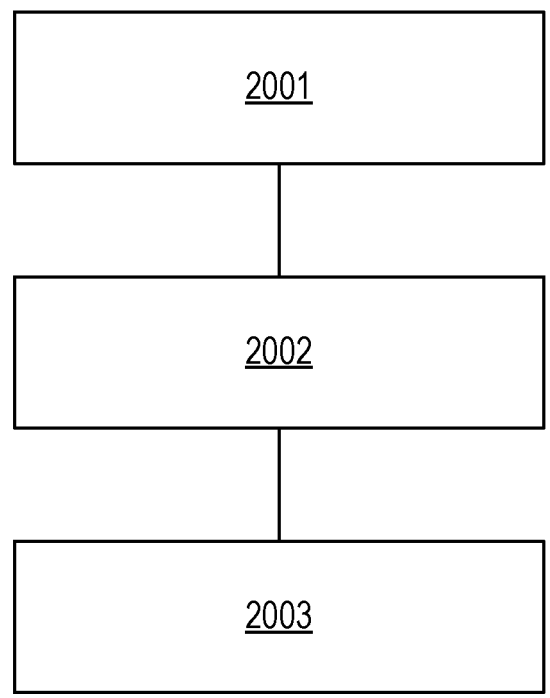
FIGS. 20 and 21 show a method for updating a database and a system for implementing same.
Figure 21:
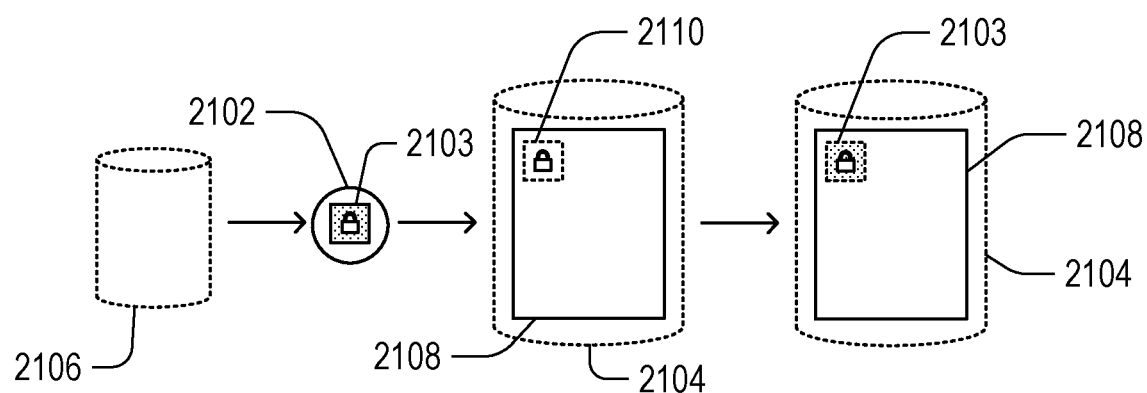

An exemplary management request for updating a secure element will now be discussed with reference to FIGS. 20 and 21. For ease of comparison with previous examples and Figures, elements of FIG. 21 similar to corresponding elements of the previous examples are labelled with reference signs similar to those used in previous Figures and examples, but with prefix "21".

In a first step 2001, a management request 2102 is received, the management request comprising at least one updated version of a secure element 2103.

In a second step 2002, the management request is processed by updating the representation database 2108 to include the updated version of the secure element. The step of updating may be carried out in any suitable manner. In an example, the existing secure element 2110 within the representation database is simply replaced with the updated secure element 2103. In an example, the step of updating comprises: creating a second instance of the representation database, the second instance being identical to the first instance of the representation; and updating the second instance of the representation database to include the updated version of the secure element. In another example, the step of updating further comprises deriving a difference between the first instance of the representation database and the second of the representation database to create a difference database, the difference database representing changes made to the representation database. It will be appreciated that the difference may be derived in any of a number suitable fashions. In yet another example, deriving the difference comprises performing a logical XOR operation. It will be appreciated that a number of specific implementations of this difference derivation may be envisaged.

In a third step 2003, a processing result is provided (not shown). The processing result may be provided in any suitable fashion. In some examples, the processing result is provided in substantially a similar fashion to those described above. In an example, providing a processing result comprises transmitting the at least part of the difference database to at least one requesting entity (for example in a manner substantially identical to that described above). As the difference database is typically smaller than the representation database, it is advantageous to transmit the difference database if there are transmission restrictions (e.g. low bandwidth) between the system and the requesting entity. In some examples, the processing result may be encoded and/or encrypted in a suitable manner (in a manner similar to that described above).

It will be appreciated that any of the preceding examples can be used in isolation or in combination dependent on particular circumstances. It will further be appreciated that the preceding examples may be applied to any suitable data types and formats. In some examples, each of the secure elements is derived from a corresponding dataset containing confidential data based on an irreversible operation. The irreversible operation may be carried out in any suitable manner, provided that it provides one or more secure elements from which the original dataset on which the secure element is based is not extractable. In some examples, the irreversible operation is a hashing operation of at least a portion of the at least one dataset.

It will additionally be appreciated that the representation database, as well as the at least one secure elements, of the preceding examples may be implemented in a number of specific fashions. Exemplary implementations of the at least one secure element include, without limitation: a cuckoo filter or a bloom filter.

A number of exemplary management systems, in which some or all of the above exemplary operations may be implemented, will now be discussed. It will be appreciated that the management systems discussed in the following are exemplary only, and that other specific implementations may be envisaged. For example, implementations in which one of the exemplary management systems incorporates one or more specific features from one of the other exemplary management systems shown below may be envisaged. It will also be appreciated that the following exemplary management systems, or variations thereof, may, in some examples, be combined or may be used concurrently. For example, in an example, a management system may treat management requests differently depending on the originating entity or the type or format of secure elements involved. For example, management requests originating from law enforcement agencies may be treated differently than management requests from financial entities. This may be due to any number of factors, such as confidentiality or data sharing requirements, or on legal or regulatory requirements.

For purposes of clarity, similar elements in the following examples and Figures will be labelled with similar reference signs, but with prefixes referring to the specific Figure.

Figure 22:
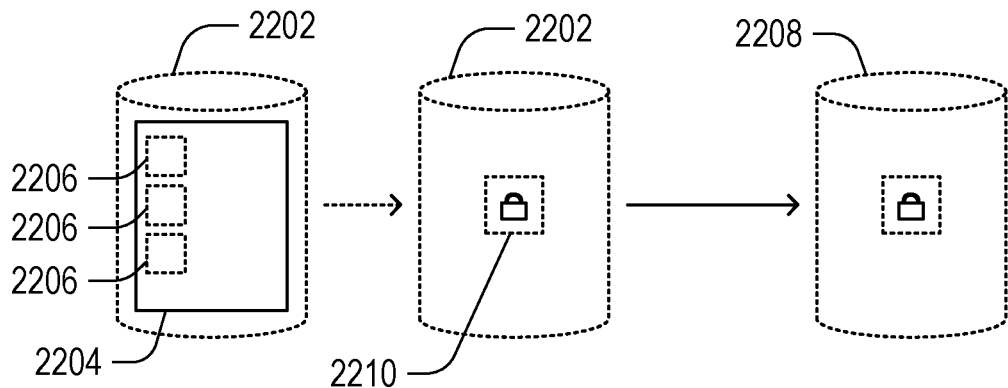
FIG. 22 shows a first exemplary implementation of a system according to the invention.

A first exemplary system is shown in FIG. 22. In this example, a first entity 2202 owns a database 2204 that comprises a number of confidential data elements 2206. In order to share the confidential data elements with a second entity 2208, it has typically been necessary to transmit relevant data elements to be shared to the second entity (as described above, e.g. with reference to FIG. 1). However, even though such data elements may be encrypted, there is a risk that the data elements are intercepted by unauthorised third parties. Furthermore, the first entity may not wish or be able to share the data elements with the second entity due to the above-mentioned requirements.

To overcome this, first entity creates one or more secure elements 2210 based on the confidential data elements. The secure elements are created by way of an irreversible operation (for example as described above). The content of the data elements cannot, therefore, be extracted from the secure elements by the second entity or an unauthorised third party (or indeed by the first entity). However, the second entity is able to utilise the secure elements to detect the presence of specific data elements without having access to the original data elements. For example, the first and second entities could be law enforcement agencies, and the confidential data elements owned by the first entity could comprise contraband data (which may for example be illegal to share or distribute).

Figure 23:
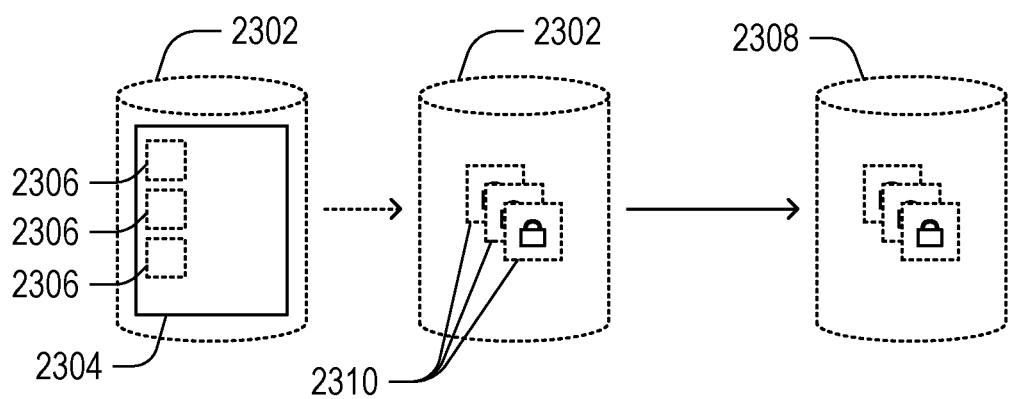
FIG. 23 shows a second exemplary implementation of a system according to the invention.

FIG. 23 shows a second exemplary system that is similar to that shown in FIG. 22. However, in this exemplary system, the first entity 2302 creates a plurality of secure elements 2310 based on the original data elements 2306.

Each secure element may be defined in any suitable way. In one example, each secure element corresponds to a certain characteristic of the data elements. If, for example, the data elements comprise a plurality of images, each secure element may correspond to a specific image category. This enables the second entity 2308 to perform data searched based on image category without requiring access to the original image data. In other examples, specific pre-determined parameters may be used to categorise each data elements into one or more secure elements.

Figure 24:
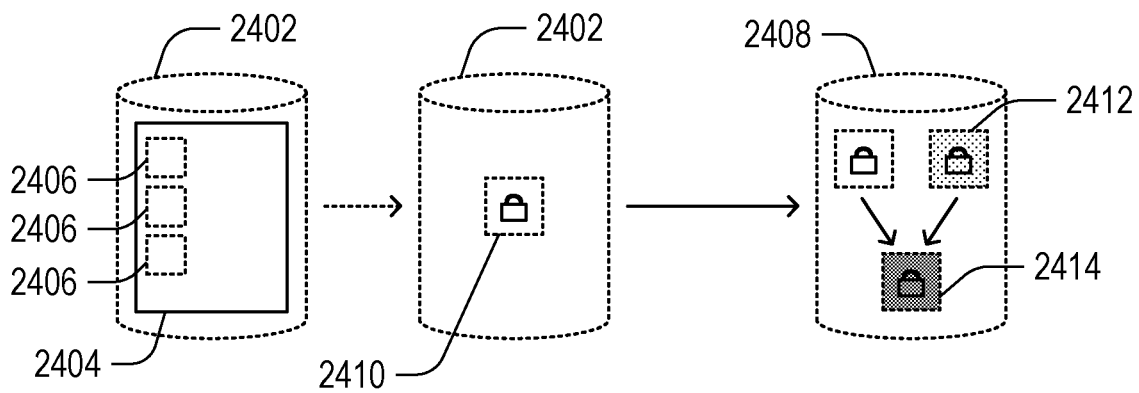
FIG. 24 shows a third exemplary implementation of a system according to the invention.

A third exemplary system will now be described with reference to FIG. 24. The exemplary system is similar to that described with reference to FIGS. 22 and 23. In the present example, the second entity 2408 is already in possession of a second secure element 2412. Upon receiving the first secure element 2410 from the first entity 2402, the second entity merges the first secure element with the second secure element, thereby to create a merged secure element 2414. This allows the second entity to, for example, search for the presence of specific data elements using the merged secure element, thereby increasing the amount of searchable data without requiring access to the data elements owned by the first entity.

Figure 25:
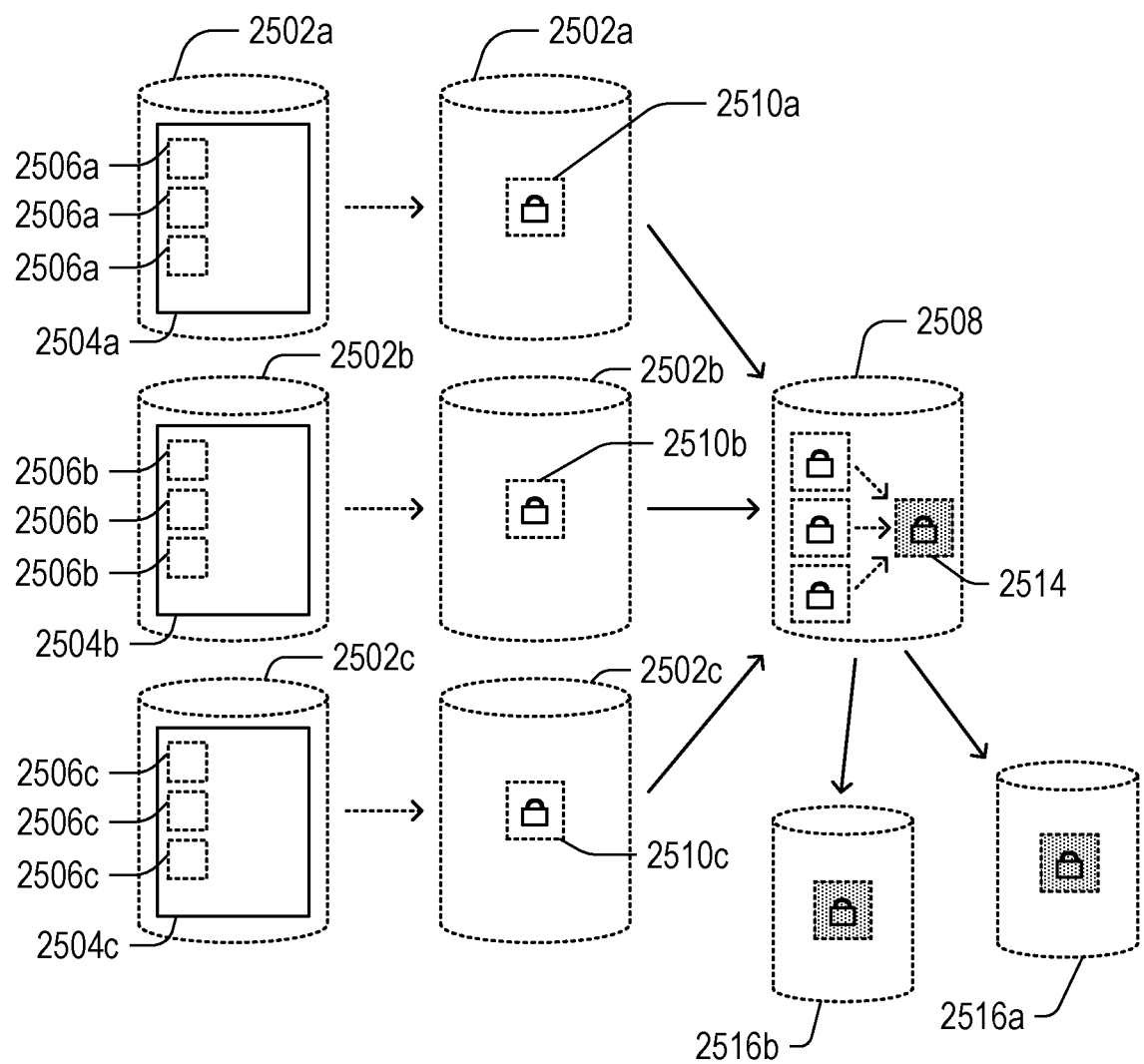
FIG. 25 shows a fourth exemplary implementation of a system according to the invention.

A fourth exemplary system is shown in FIG. 25. In this exemplary system, a plurality of first entities 2502a, 2502b, 2502c are each in possession of a database 2504a, 2504b, 2504c comprising a number of confidential data elements 2506a, 2506b, 2506c. Each of the first entities creates one or more secure elements 2510a, 2510b, 2510c based on the confidential data elements in a manner described with reference to FIGS. 22-24 above. Each of the secure elements is then transmitted to a second entity 2508 (e.g. a handling or data brokerage entity). The second entity merges the received secure elements, to create a merged secure element 2514. This merged secure element can then be distributed to one or more third entities 2516a, 2516b, where it may be utilised to search for data of interest. In some examples, the merged secure element may also be distributed to the first entities.

In the examples described above, only secure elements are transmitted between the various entities. In other terms, no additional information (e.g. metadata relating to individual secure elements or confidential data elements) is transmitted between the entities. In practice, however, such additional information can be a vital source of relevant information for examination or research purposes. For example, merely detecting the presence of a relevant data element in a database may not be enough for purposes of an investigation. In such instances, it is necessary to transmit additional information along with the secure elements. For example, if contraband data is detected, it may be necessary to acquire data relating to the origins of the data in order to proceed with the investigation.

Such additional information can consist of several different specific types or categories of information. Some categories of additional information may be substantially benign in nature, i.e. if intercepted by unauthorised third parties there would be no substantial harm caused. Other categories of additional information may be confidential or highly confidential. Such additional information should be prevented from interception, e.g. by suitable encryption or encoding, and may in some cases be subject to restrictions on distribution between entities. In some examples, such additional information may not be made available to anybody but the entity in possession of the data unless an enquiring entity is vetted or cleared according to certain criteria. Further, in some examples, even a request for additional information may be required to be confidential.

Figure 26:
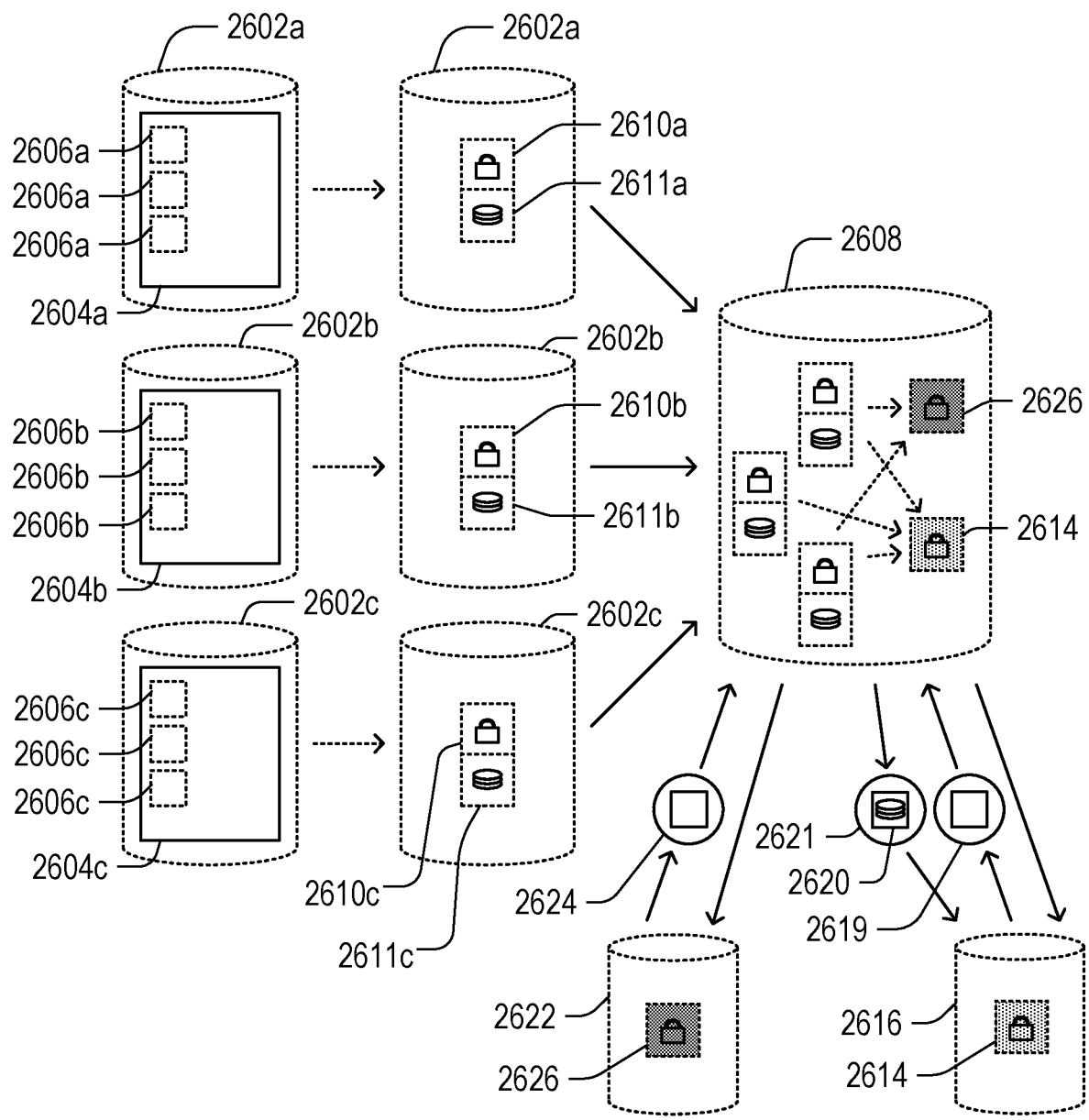
FIG. 26 shows a fifth exemplary implementation of a system according to the invention.

FIG. 26 shows an exemplary system in which additional information is transmitted between entities. A number of first entities 2602a, 2602b, 2602c are each in possession of a database 2604a, 2604b, 2604c comprising a number of confidential data elements 2606a, 2606b, 2606c. Each of the first entities creates a secure element 2610a, 2610b, 2610c based on at least some of the contents of the database. Additionally, each of the first entities assembles additional information 2611a, 2611b, 2611c associated with at least some of the secure elements. As discussed above, any suitable additional information may be assembled by the first entities, subject to sharing and confidentiality requirements.

The secure elements and the corresponding additional information is transmitted to the second entity 2608 by each of the first entities. The second entity merges at least some of the received secure elements (or portions thereof), to create a merged secure element 2614. The corresponding additional information is not merged, but is stored securely by the second entity. The additional information may be stored in any suitable fashion.

The merged secure element is then distributed to a third entity 2616, where it may be utilised to search for data of interest. If the third entity detects the presence of data of interest, the third entity transmits a further request 2619 to the second entity, the further request comprising a request for additional information. The additional information may be related to a portion or the whole of the merged secure element 2614. Based on the request, the second entity transmits to the third entity one or more pieces of relevant additional information 2620, for example as part of a further processing result 2621, to the third entity.

Additionally or alternatively to this methodology, a fourth entity 2622 may send a custom request 2624 to the second entity, the custom request comprising a request for at least part of one of the secure elements stored by the second entity. This could be relevant if, for example, the second entity stores data from a large number of first entities (of different types) or if the fourth entity only requires or is limited to certain types or categories of data. It will be appreciated that, in principle, any combination of secure elements or portions thereof may be requested. In some examples, the second entity creates a custom merged secure element 2626 based on the custom request. Once created, the custom merged secure element is transmitted to the fourth entity, where it may be utilised to search for data of interest.

Depending on the confidentiality requirements, the additional information may be subject to transmission and/or storage restrictions. For example, benign additional information may be shared relatively freely between the second and third or fourth entities, whereas confidential additional information may be subject to stricter transmission and/or storage requirements or further may require procedures designed to prevent interception of the additional information.

In the example shown in FIG. 26, the second entity is in possession of the additional information relating at least some of the secure elements. However, under certain circumstances, the additional information may not be shared with the second entity by the first entities. This could, for example, be due to the additional information comprising highly confidential information that is subject to very restrictive transmission requirements.

Figure 27:
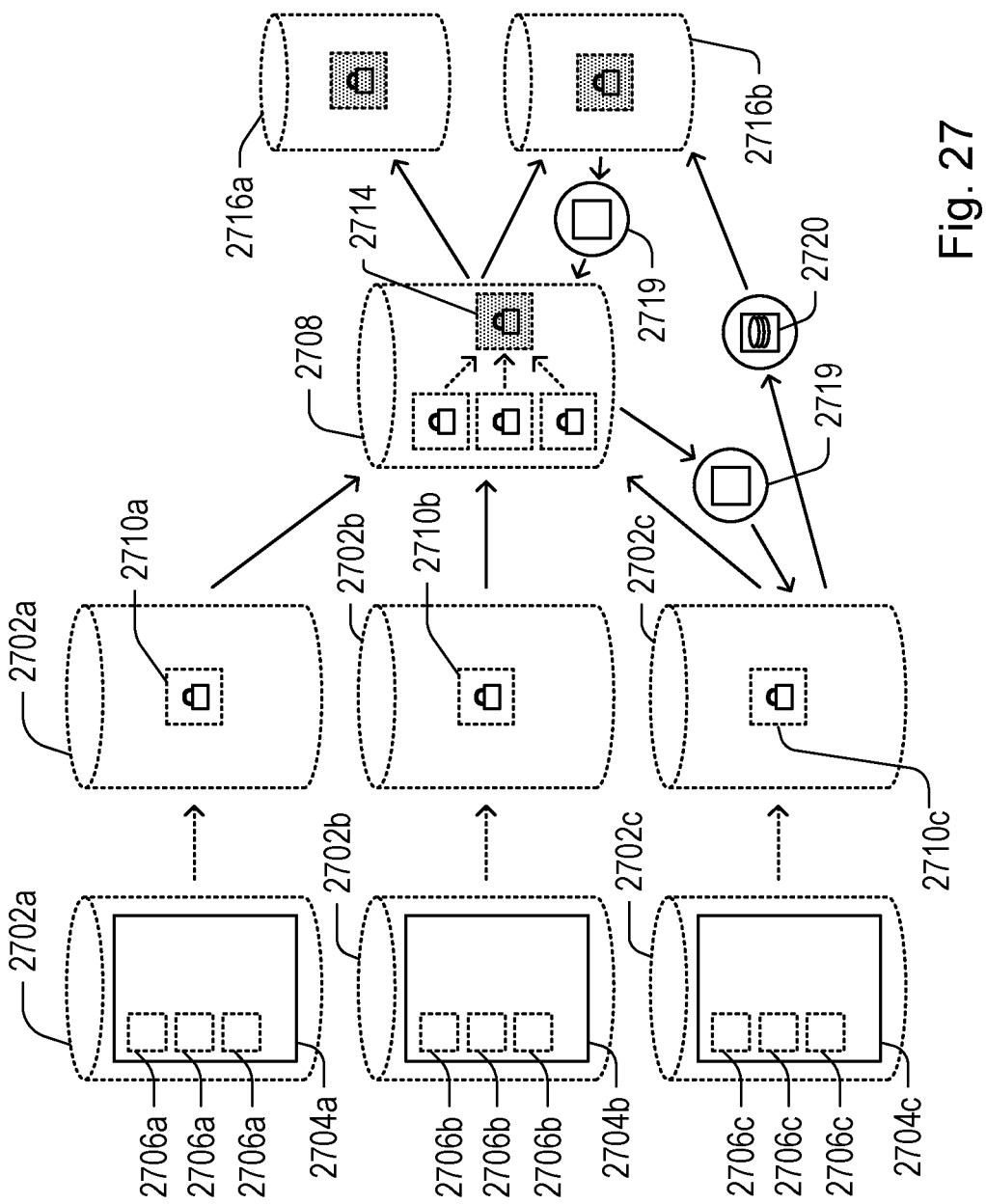
FIG. 27 shows a sixth exemplary implementation of a system according to the invention.

FIG. 27 shows an exemplary system, in which the additional information is not shared with the second entity 2708.

In this example, secure elements 2710a, 2710b, 2710c are generated by the first entities 2702a, 2702b, 2702c and transmitted to the second entity 2708 in a fashion similar to that described above. The second entity then creates a merged secure element 2714 and transmits it to third entities 2716a, 2716b. A third entity 2716b utilises the merged secure element to search for data of interest. If the presence of data of interest is detected within the merged secure element, the third entity transmits a further request 2719 for additional information to the second entity 2708. As the second entity is not in possession of the additional information, the second entity merely determines the originating first entity 2702c of the secure element 2710c in which the data of interest is detected. Subsequently, the further request 2719 is forwarded to the originating first entity. The originating first entity may then determine whether or not to transmit the relevant additional information 2720 to the third entity based on the further request. The determination made at the originating first entity may be made automatically based on one or more parameters and requirements, or it may be made manually. The additional information may be encoded and/or encrypted in any suitable fashion. In one example, the additional information is encrypted using public key encryption. The additional information, while shown as being transmitted directly to the third entity, may be transmitted directly or indirectly to third entity (for example via the second entity).

Figure 28:
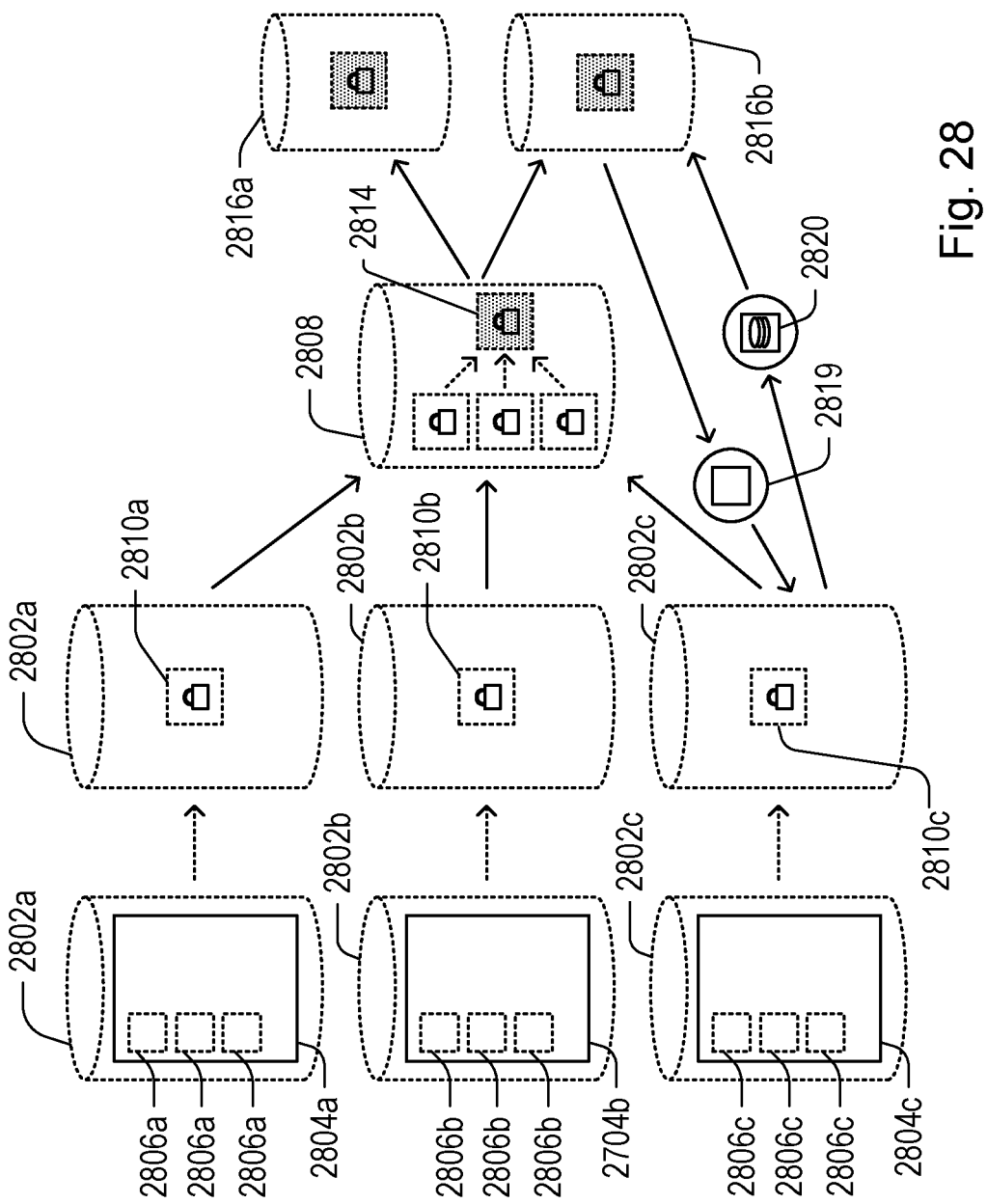
FIG. 28 shows a seventh exemplary implementation of a system according to the invention.

FIG. 28 shows a further exemplary system. This exemplary system is substantially identical to that shown in FIG. 27, except for the following.

Instead of transmitting the further request 2819 to the second entity, the third entity 2816b transmits the further request directly to the originating first entity 2802c. In order to facilitate this, originator information regarding the origin of the information contained within may, in some examples, be comprised in the merged secure element 2814. In other examples, the originator may be transmitted separately from the merged secure element. Once the presence of data elements being searched for have been detected, the third entity may exchange transmissions, including encoding and/or encryption information directly with the originating first entity. In some examples, the merged secure element additionally comprises encoding and/or encryption information for each of the originating entities. In both situations, once the merged secure element has been transmitted to the third entity, the second entity is no longer involved in any exchange of information.

The descriptions above are intended to be illustrative, not limiting. Thus, it will be apparent to one skilled in the art that modifications may be made to the invention as described without departing from the scope of the claims set out below.

The invention claimed is:

1. A computer implemented method of data management for a computer implemented system for identification of digital content elements, the method comprising:
   receiving at least one data request from a requesting entity, the data request being associated with at least one secure element;
   processing the at least one data request by identifying at least a portion of a representation database, wherein the representation database comprises the at least one secure element, the at least one secure element being a secure representation of at least. a fragment of a confidential data element of at least one dataset stored in at least one database, wherein the at least one dataset contains the confidential digital content; and
   providing at least one processing result by transmitting the identified portion of the representation database to the requesting entity, thereby to enable processing at the requesting entity,
   wherein the receiving at least one data request comprises receiving a first secure element, the first secure element being a secure representation of at least one dataset stored in a first database, and the processing comprises adding the first secure element with the representation database.

2. The method according to claim 1, wherein the step of adding comprises performing a bitwise logical OR operation on the first secure element and at least one secure element comprised in the representation database.

3. The method according to claim 1, wherein the identified portion comprises at least a first portion of at least the first secure element comprised in the representation database.

4. The method according to claim 3, further comprising receiving a further request for additional information from the requesting entity.

5. The method according to claim 1, further comprising transmitting additional information associated with the identified portion to the requesting entity.

6. The method according to claim 4, wherein the further request for additional information is forwarded to an owner of a database represented by the at least first secure element, the owner being operable to transmit the additional information directly to the requesting entity in response to the forwarded further request.

7. The method according to claim 3, further comprising:
   receiving, at an owner of a database represented by the at least first secure element, a further request for additional information, the owner being operable to transmit the additional information directly to the requesting entity in response to the forwarded further request.

8. The method according to claim 1, wherein:
   the data request comprises a search request associated with a secure element to be searched for; and the step of processing further comprises processing the search request.

9. The method according to claim 8, wherein the search request comprises one of: a secure representation of the secure element to be searched for; or a unique identifier representing a secure element to be searched for.

10. The method according to claim 8, wherein the step of processing the search request comprises:
    comparing the search request with each of the at least one secure element m the representation database; and
    if the search request is determined to be associated with a secure element located within the representation database, then retrieving additional information associated with the secure element, wherein the step of providing a processing result comprises transmitting the additional information to the requesting entity.

11. The method according to claim 8, further comprising receiving a further request for additional information from the requesting entity.

12. The method according to claim 11, wherein the further request for additional information is forwarded to an owner of a database represented by the secure element to be searched for, the owner being operable to transmit the additional information directly to the requesting entity in response to the forwarded further request.

13. The method according to claim 8 further comprising: receiving, at an owner of a database represented by the secure element to be searched for,
   a further request for additional information, the owner being operable to transmit the additional information directly to the requesting entity in response to the forwarded further request.

14. The method according to claim 4, wherein the additional information comprises at least one of the following: originator information associated with the secure element; identifier information identifying an owner of the database represented by the secure element; contact information relating to an owner of the database represented by the secure element;
   classification information associated with either or both of the secure element or the database; a unique identifier associated with the secure element and/or the database; or metadata associated with either or both of the secure element or the database.

15. The method according to claim 8, wherein:
processing the search request comprises identifying at least a portion of the representation database; and
   providing a processing result comprises transmitting the identified portion of the representation database to the requesting entity, thereby to enable processing at the requesting entity.

16. The method according to claim 15, wherein the identified portion comprises at least a first portion of at least the first secure element comprised in the representation database.

17. The method according to claim 15, wherein the step of providing a processing result further comprises transmitting additional information associated with the identified portion to the requesting entity.

18. The method according to claim 15, further comprising receiving a further request associated with a secure element to be searched for.

19. The method according to claim 18, further comprising:
   processing the further request by comparing the further request with each of the at least one secure element in the representation database, and if the further request is determined to be associated with a secure element located within the representation database, then retrieving additional information associated with the secure element; and
   transmitting the additional information to the requesting entity.

20. The method according to claim 18, wherein the further request for additional information is forwarded to an owner of a database represented by the secure element to be searched for, the owner being operable to transmit the additional information directly to the requesting entity in response to the forwarded further request.

21. The method according to claim 15, further comprising:
   receiving, at an owner of a database represented by the secure element to be searched for,
   a further request for additional information, the owner being operable to transmit the additional information directly to the requesting entity in response to the forwarded further request.

22. The method according to claim 17, wherein the additional information comprises at least one of: originator information associated with the transmitted portion of the representation database; identifier information identifying an owner of at least one database represented by the transmitted portion of the representation database; contact information relating to an owner of at least one database represented by the transmitted portion of the representation database; classification information associated with either or both of the transmitted portion of the representation database or at least one database represented by the transmitted portion of the representation database; a unique identifier associated with either or both of the transmitted position of the representation database or at least one database represented by the transmitted position of the representation database; or metadata associated with either or both of the transmitted position of the representation database or at least one database represented by the transmitted position of the representation database.

23. The method according to claim 10, wherein providing a processing result further comprises transmitting a notification to either of: an owner of at least one dataset represented by a secure element identified during processing of the search request; or an owner of at least one database being used to store at least one dataset represented by a secure element identified during processing of the search request.

24. The method according to claim 1, wherein each of the secure elements is derived from a corresponding dataset containing confidential data based on an irreversible operation.

25. The method according to claim 24, wherein the irreversible operation is a hashing operation of at least a portion of the at least one dataset.

26. The method according to claim 1, wherein the secure element comprises one of: a cuckoo filter; or a bloom filter.

27. A computer implemented method of data management for a computer implemented system for identification of digital content elements, the method comprising:
   receiving at least one data request from a requesting entity, the data request being associated with at least one secure element;
   processing the at least one data request by identifying at least a portion of a representation database, wherein the representation database comprises the at least one secure element, the at least one secure element being a secure representation of at least. a fragment of a confidential data element of at least one dataset stored in at least one database, wherein the at least one dataset contains the confidential digital content; and
   providing at least one processing result by transmitting the identified portion of the representation database to the requesting entity, thereby to enable processing at the requesting entity,
   wherein the data request comprises at least one unique identifier representing at least one secure element, the step of processing the at least one data request comprises merging at least a part of a first secure element with at least a part of a second secure element, and the step of providing at least one processing result comprises transmitting the merged secure element to the requesting entity.

28. The method according to claim 27, wherein the step of merging comprises performing a bitwise logical OR operation on the at least first secure element and the at least second secure element.

29. A computer implemented method of data management for a computer implemented system for identification of digital content elements, the method comprising:
   receiving at least one data request from a requesting entity, the data request being associated with at least one secure element;
   processing the at least one data request by identifying at least a portion of a representation database, wherein the representation database comprises the at least one secure element, the at least one secure element being a secure representation of at least. a fragment of a confidential data element of at least one dataset stored in at least one database, wherein the at least one dataset contains the confidential digital content; and
   providing at least one processing result by transmitting the identified portion of the representation database to the requesting entity, thereby to enable processing at the requesting entity,
   wherein the receiving comprises receiving at least one updated version of a secure element and the processing comprises updating the representation database to include the updated version of the secure element.

30. The method according to claim 29, wherein the step of updating comprises:
   creating a second instance of the representation database, the second instance being identical to the first instance of the representation; and
   updating the second instance of the representation database to include the updated version of the secure element.

31. The method according to claim 30, further comprising deriving a difference between the first instance of the representation database and the second of the representation database to create a difference database, the difference database representing changes made to the representation database.

32. The method according to claim 31, wherein deriving a difference comprises performing a logical XOR operation.

33. The method according to claim 31, further comprising transmitting the at least part of the difference database to at least one requesting entity.

* * * * *